Feb. 7, 1956 H. V. PFETZING 2,733,668
FITTING FOR A GAS EXHAUST SYSTEM
Filed Aug. 2, 1951 2 Sheets-Sheet 1

INVENTOR.
HENRY V. PFETZING
BY
Burton & Parker
ATTORNEYS

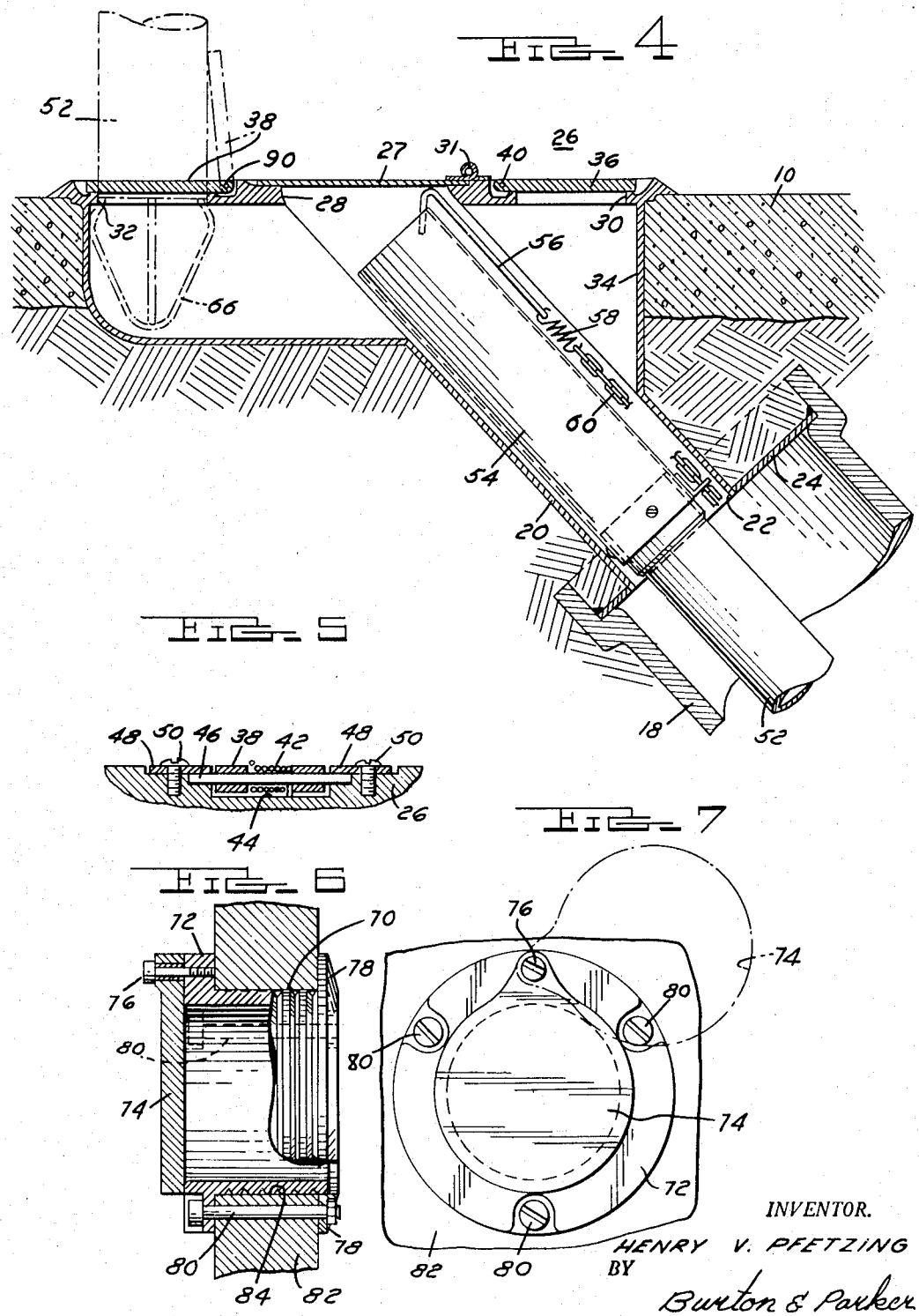

United States Patent Office 2,733,668
Patented Feb. 7, 1956

2,733,668

FITTING FOR A GAS EXHAUST SYSTEM

Henry V. Pfetzing, Detroit, Mich., assignor to Kent-Moore Organization, Inc., Detroit, Mich., a corporation of Michigan Application August 2, 1951, Serial No. 239,985

2 Claims. (Cl. 104—52)

This invention relates to an improved fitting for a gas exhaust system adapted to withdraw exhaust gas from a motor vehicle within a building and discharge the gas outside of the building.

Heretofore it has been the practice to provide buildings designed for storage and repair of motor vehicles with gas exhaust systems including flexible conduits adapted to be coupled with the exhaust outlets of motor vehicles being operated within the building. Such gas exhaust system might be one wherein a main exhaust duct was located above the floor and provided with a plurality of flexible tube branch ducts or conduits each of which was adapted to be coupled with the tail pipe of an automobile to receive exhaust gas therefrom. The main duct communicated with a suction fan or the like adapted to withdraw gas through the duct from the branch ducts and deliver the same outside of the building.

On the other hand, the exhaust system might be one in which the main exhaust duct was disposed underground and provided with branch ducts leading to floor openings, one branch for each stall within which a motor vehicle might be serviced. A flexible tube was provided for each branch duct to couple the tail pipe of a motor vehicle with the underground branch duct so as to withdraw the gas exhausted by a vehicle engine during its running. It will be understood that means was provided, commonly a suction fan, to impose suction on the exhaust ducts and withdraw exhaust gas and eject it out of doors.

The means used to couple the tail pipes of motor vehicles with the underground branches might be separate tubes adapted to be disconnected from the underground system and from the tail pipes of the automobiles and hung in provided places within the building. On the other hand such tubes might be part of the underground system and normally stored therein and withdrawn only partially therefrom to be connected with the tail pipes of the vehicles. Both types of construction have been used.

The underground system possessed the advantage over the overhead system of being completely concealed and out of the way, but it involved substantial expense to install. If the exhaust tubes formed a part of the underground system and were stored therein it was necessary to provide one at each stall so that a vehicle occupying the stall could be coupled up with the system. It was also necessary to provide a branch conduit leading from the underground main to each stall.

This invention relates primarily to the fitting with which the flexible conduit is connected. As applied to the underground system the invention disclosed herein includes a branch duct for each two adjacent stalls. Each branch duct which serves two stalls is provided with the improved fitting of this invention. The fitting used with the underground system is a floor fitting having a main passageway which leads through the branch into the main underground exhaust duct. This main passageway is adapted to receive the flexible tube for storage therein. This main passageway has two side branch passageways which communicate therewith and have separate openings through the fitting. The flexible tube may be withdrawn completely from the main passageway and connected at one end with an automobile tail pipe and at the opposite end with either side branch passageway of the main or tube storage passageway within the fitting.

Such floor fitting and branch duct leading from the underground exhaust main therefore provides a main branch passageway which serves also as a storage chamber for a flexible tube and two side passageways communicating with the main branch and storage passageway. A motor vehicle may be connected by means of a flexible tube with either side passageway. Two motor vehicles may be connected at the same time with the fitting through connection with the two side branches.

This construction simplifies and reduces the cost of the underground system while permitting it to serve the same number of stalls within a building. It reduces the underground piping and also reduces by one-half the number of flexible tubes required by the system as compared with the earlier system.

As applied to an above the floor exhaust, the improved fitting with which the flexible tube is connected is a wall or door fitting. It is a fitting which is adapted to be mounted within the thickness of an outside door or the thickness of an outer wall. One end of the flexible tube which has its opposite end connected with the automobile tail pipe is coupled with this fitting or may be passed therethrough to discharge exhaust gas out of doors. This fitting is provided with a closure plate to normally close the opening therethrough. The fitting is of such a character that it is capable of being mounted within doors or walls which vary in thickness.

Other objects, advantages and meritorious features will more fully appear from the following description, claims, and accompanying drawings, wherein:

Fig. 4 is a vertical sectional view taken on the line 4—4 of Fig. 2 and showing in solid line the flexible tube stored within the device and showing in dotted outline a flexible tube connected at one end with one of the side branches of the underground conduit;

Fig. 5 is a fragmentary vertical sectional view taken on the line 5—5 of Fig. 2;

Fig. 6 is a cross sectional view through an improved fitting representing a modification of the invention as compared with Figs. 1 through 5;

Fig. 7 is a front elevation of the fitting shown in Fig. 6.

Fig. 8 is a sectional view taken on the line 8—8 of Fig. 3.

Figure 1:
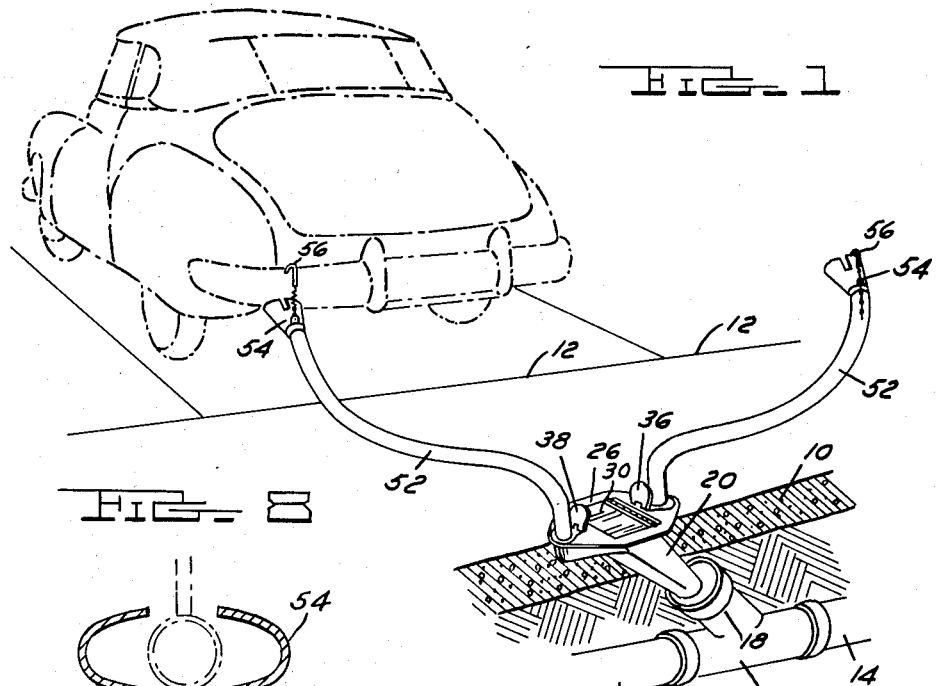
Fig. 1 is a perspective partly broken away showing in section a fragment of an underground gas exhaust system embodying my invention.
Figure 2:
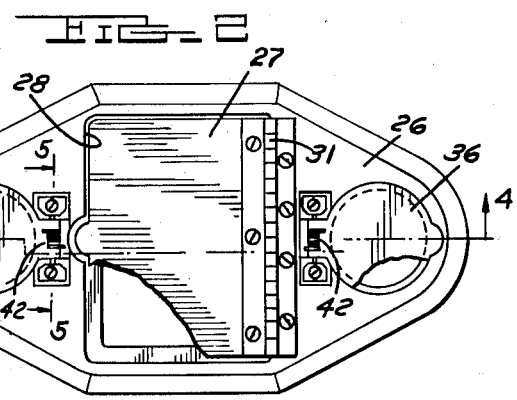
Fig. 2 is a plan of a floor plate portion of the floor fitting which is herein described.

As stated, this invention relates to an improved fitting which is adapted to receive one end of a flexible tube or hose the opposite end of which is connected with an automobile exhaust pipe. If the fitting is a floor fitting for an underground system the building is provided underneath the floor with an underground main exhaust duct which communicates with a suction fan. The fan withdraws gas from the duct and discharges it outside of the building. The floor of the building is provided with a row of car stalls or spaces each of which is adapted to support a motor vehicle. These stalls are arranged in pairs as shown in Fig. 1. The main exhaust duct extends underneath the floor along such row of stalls. A branch duct extends from the main duct up the floor adjacent the two stalls of each pair. This branch duct is shown in the form of a Y connection.

In Fig. 1 the floor of such a building is indicated at 10. Two car stalls each indicated by the numeral 12 are marked out on the floor. The underground main duct is indicated by the numeral 14. This duct is of the sectional sewer pipe type of structure and includes a Y section 16. This section 16 has a branch 18 which projects angularly upwardly as shown. Communicating with this branch 18 is my improved floor fitting.

My improved floor fitting embodies a funnel-shaped conduit 20 which is adapted to be embedded within the floor. This conduit 20 has a reduced end 22 communicating with the extension 18, as shown. Such communication is shown in section in Fig. 4 wherein an end plate 24 is provided for the branch 18 through which end plate the reduced end of the funnel-shaped conduit 20 extends.

The upper end of this funnel-shaped conduit is provided with a floor plate 26 which projects horizontally therefrom as shown in Figs. 1 and 4. This funnel-shaped conduit is of a generally rectangular shape in cross section as shown in Fig. 1. It defines the main branch passageway. The floor plate projects away from the funnel-shaped conduit in such a manner that on one side thereof it extends therefrom at an acute angle to such side and on the opposite side thereof it projects therefrom at an obtuse angle to the adjacent side of the conduit. The floor plate 26 is provided with an opening 28 therethrough into the large end of the funnel-shaped main branch passageway. This opening is controlled by a closure plate 27 hinged to the floor plate at 31 and adapted normally to close the opening.

The floor plate is provided on opposite sides of the opening 28 with openings 30 and 32. Opening 30 is the intake for a side branch passageway 34 which extends vertically into the main branch passageway. Opening 32 is the intake for a side branch which extends horizontally underneath the floor plate 26 into the funnel-shaped main branch passageway. Each side branch opening is controlled by its own closure plate. Closure plate 36 controls opening 30. Closure plate 38 controls opening 32. Each closure plate is hinged as at 40 to the floor plate 26 and a spring 42 is provided to hold the closure plate down to close the opening.

Fig. 5 shows this hinge construction which is of a novel design. The floor plate 26 is provided with a recess 44 within which the closure 38 is mounted. This closure is pivoted upon a pin 46. This pin seats at opposite ends within provided recesses in the floor plate. Small plate sections 48 are held down by screws 50 to retain the pin in place. The spring 42 previously described is illustrated in this Figure 5.

A flexible tube or hose is indicated by the numeral 52. Two of these flexible tubes are shown in Fig. 1, one connected with each side branch intake of the floor plate. Each flexible tube or hose is formed of suitable material such as a series of stainless steel tubular sections linked together to provide for flexibility while maintaining a tight seal and yet of sufficient stiffness to permit of endwise insertion through the provided passageway through the underground ducts.

Figure 3:
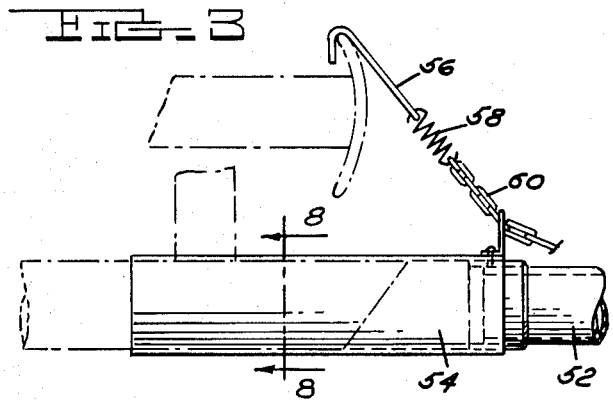
Fig. 3 illustrates a fragmentary elevation of part of the flexible tube showing same connected with the exhaust pipe of a motor vehicle.

At its upper end, each tube 52 is provided with a funnel-shaped intake 54. This funnel-shaped intake is adapted to be received over the tail pipe of a motor vehicle. These tail pipes vary in size and shape but it has been found that a close fit is not essential because if additional air is drawn into the system no harm is done. The funnel-shaped intake may be held on the tail pipe by a hook 56 connected with the tube by spring 58 and chain 60 and coupled with the car bumper, all as shown in Figs. 1 and 3.

The opposite end of the tube may be provided with a suitable nose fitting 66 formed of spring wire or the like. This nose fitting is designed to serve the purpose shown in Fig. 4. It serves also to facilitate shoving the tube down through the passageway into the underground system. This particular nose end portion forms no part of the instant invention but is included in the subject matter of another application.

Each floor fitting as disclosed herein is adapted to carry stored within it a single flexible tube or hose connection 52. Such flexible hose may be received therein as shown in Fig. 4 in solid line. When so stored the hose is normally of such a length as to extend down into the main duct 14. The hose is stored within the main branch passageway of the funnel-shaped fitting 20 and branch duct 18. The funnel-shaped intake portion 54 of the flexible hose seats within the funnel-shaped floor fitting conduit 20. When so stored the hook 56 may be connected over the edge of the intake 54. The funnel-shaped intake is of such a size that it will seat within the funnel-shaped conduit so as to be readily available for grasping by an operator to be withdrawn therefrom.

When desired for use the flexible hose is withdrawn from its stored position and the funnel end is coupled with the tail pipe of a motor car. The opposite end is disposed within intake opening 30 or 32 as the case may be. Two flexible tubes may be connected with a floor fitting at the same time by employing a hose taken from some other location.

The construction shown in Figs. 6 and 7 represents a modification wherein the fitting is designed to be positioned within a wall of the building, as for example a door or outer side wall. The fitting provides an opening through the wall which opening is normally closed by a closure plate with which the fitting is equipped. The fitting is adapted to receive one end of the flexible tube or hose the opposite end of which is coupled with the exhaust pipe of a motor vehicle to convey exhaust gas therefrom. The fitting is so constructed that it is adaptable to be disposed within wall structures of different thicknesses. The fitting is designed to be readily adapted to wall structures of varying thickness.

The modified form of fitting shown in Figs. 6 and 7 comprise a tubular portion 70 provided at one end with a radially projecting flange 72. A closure plate 74 is pivoted by means of a pin 76 to the flange to be swung to cover the adjacent end of the tubular fitting or to uncover the same. In Fig. 7 the plate 74 is shown in solid line as covering the opening through the fitting. In dotted line it is shown as swung to uncover the same.

A ring plate 78 is provided. This plate is adapted to encircle the oppsite end of the tubular portion 70 as shown in Fig. 6. Three connecting elements in the form of bolts 80 are shown as extending between the flange 72 and the ring plate 78. They extend outside the tubular portion 70 so as to pass through a wall or door structure 82 as shown in Fig. 6. The tubular portion 70 is provided with a plurality of parallel grooves or channels 84. These grooves provide lines along which the tubular portion may be cut off to different lengths to accommodate itself to different wall thicknesses.

The fitting shown in Figs. 6 and 7 is not illustrated as having the outer end of the flexible tube 52 connected therewith but it is apparent that the end of the tube shown in Fig. 4 as provided with a nose piece 66 may be inserted into the tubular portion 70 or pass therethrough so that the nose piece 66 engages over one side thereof so as to provide a conduit opening from the inside of the wall through to the outside thereof for the passage of exhaust gas therethrough.

What I claim is:

1. A floor fitting for an underground gas exhaust system for a building, said system having a branch extending from an underground conduit through an opening in the building floor, said floor fitting comprising, in combination, a funnel-shaped conduit, a floor plate having opposite ends projecting laterally oppositely away from the large end of the conduit, said plate provided with a central opening registering with the large end of said funnel-shaped conduit, a closure for said opening, said funnel-shaped conduit provided with two side branches communicating therewith and extending angularly upwardly therefrom on opposite sides thereof, said two side branches terminating in side branch openings through the floor plate which openings are disposed on opposite sides of the central opening therethrough, a closure for each side branch opening through the floor plate, a flexible hose receivable through said central opening and through said funnel-shaped conduit and the branch of the underground conduit with which it communicates for storage therein, said hose provided with a funnel-shaped intake at one end receivable through said central opening and within the funnel-shaped conduit for storage therein, that end of said flexible hose opposite to the end provided with the funnel-shaped intake being provided with an end portion receivable through either side branch opening in the floor plate and into the side branch of the funnel-shaped conduit.

2. A floor fitting for an underground gas exhaust system for a building, said system having a branch conduit extending from an underground conduit through an opening in the building floor, said floor fitting comprising, in combination, a funnel-shaped conduit generally rectangular in cross section communicating with said branch conduit, an elongate floor plate having opposite ends projecting laterally away from opposite sides of the funnel-shaped conduit and forming an acute angle with one side of the conduit and forming an obtuse angle with the opposite side thereof, said plate provided with a central opening therethrough registering with the large end of the funnel-shaped conduit, a hinged closure for said central opening, said funnel-shaped conduit provided with two oppositely disposed side branches communicating therewith and extending upwardly angularly therefrom and each terminating in a side branch opening through the floor plate, one side branch opening being through that end portion of the plate which forms an acute angle with the funnel-shaped conduit, the other side branch opening being through that portion of the plate which forms an obtuse angle with the funnel-shaped conduit, a hinged closure for each side branch opening through the floor plate, a flexible tube having a funnel-shaped fitting at one end, said tube being receivable within the funnel-shaped conduit and the branch conduit with which it communicates for storage therein, the funnel-shaped fitting at one end of such tube being receivable through the central opening of the floor plate and receivable completely within the funnel-shaped conduit for storage therein, said funnel-shaped fitting being of a size which is not receivable through either side branch opening of the floor plate or within either side branch of said funnel-shaped conduit, that end of the tube opposite to the funnel-shaped end being receivable through either side branch opening in the floor plate and into either side branch of the funnel-shaped conduit to establish communication therewith.

References Cited in the file of this patent

UNITED STATES PATENTS

| | | |
|---|---|---|
| 1,106,392 | Lonskey | Aug. 11, 1914 |
| 1,879,581 | Stougaard | Sept. 27, 1932 |
| 2,236,937 | Clark | Apr. 1, 1941 |
| 2,449,803 | Collison | Sept. 21, 1948 |
| 2,567,165 | Buskirk | Sept. 11, 1951 |

FOREIGN PATENTS

| | | |
|---|---|---|
| 426,518 | England | Apr. 4, 1935 |

OTHER REFERENCES

Chrysler Corp. publication entitled Building Construction Information, Section 12, Exhaust Gas Removal System. Copyrighted Sept. 27, 1945. (A copy is available for photostating in class 104, sub-class 52 of the Patent Office.)